United States Patent
Patil et al.

(10) Patent No.: US 11,656,130 B2
(45) Date of Patent: May 23, 2023

(54) WIRE MESH GROMMET FOR FIRE AND OVERHEAT DETECTION SYSTEM

(71) Applicant: Kidde Technologies, Inc., Wilson, NC (US)

(72) Inventors: Rhushikesh Patil, Karnataka (IN); Vinod Maruti Naik, Karnataka (IN); Scott Kenneth Newlin, Willow Spring, NC (US)

(73) Assignee: KIDDE TECHNOLOGIES, INC., Wilson, NC (US)

( * ) Notice: Subject to any disclaimer, the term of this patent is extended or adjusted under 35 U.S.C. 154(b) by 590 days.

(21) Appl. No.: 16/780,153

(22) Filed: Feb. 3, 2020

(65) Prior Publication Data

US 2021/0172804 A1  Jun. 10, 2021

(30) Foreign Application Priority Data

Dec. 9, 2019  (IN) .............................. 201911050817

(51) Int. Cl.
| | | |
|---|---|---|
| *G01K 1/14* | (2021.01) | |
| *A62C 37/36* | (2006.01) | |
| *F16L 3/237* | (2006.01) | |

(52) U.S. Cl.
CPC ................ *G01K 1/14* (2013.01); *A62C 37/04* (2013.01); *F16L 3/237* (2013.01)

(58) Field of Classification Search
CPC ............ G01K 1/14; A62C 37/04; F16L 3/237
See application file for complete search history.

(56) References Cited

U.S. PATENT DOCUMENTS

| | | | |
|---|---|---|---|
| 4,259,542 A | | 3/1981 | Tehan et al. |
| 6,533,977 B1 | | 3/2003 | Zettel et al. |
| 6,775,593 B1 | * | 8/2004 | Parker ................. F16K 37/0075 700/282 |
| 7,469,563 B2 | * | 12/2008 | Wahlgren .................. F01N 1/24 66/169 R |
| 7,784,585 B2 | * | 8/2010 | Greenwood ........ F01N 13/1855 29/523 |
| 8,727,125 B2 | * | 5/2014 | Tieben .............. H01L 21/67017 211/41.18 |
| 9,482,113 B2 | * | 11/2016 | Graily ........................ F02C 7/25 |
| 10,337,130 B2 | | 7/2019 | Stewart et al. |
| 10,663,353 B2 | * | 5/2020 | Newlin .................. F16M 13/02 |
| 11,092,079 B2 | * | 8/2021 | Patil ........................ G01K 3/005 |
| 2005/0191868 A1 | * | 9/2005 | Beck .......................... F16L 5/10 439/34 |
| 2006/0219860 A1 | * | 10/2006 | Greenwood ........ B60R 13/0869 248/560 |

(Continued)

FOREIGN PATENT DOCUMENTS

| | | |
|---|---|---|
| CN | 105627062 A | 6/2016 |
| EP | 2930484 A1 | 10/2015 |

OTHER PUBLICATIONS

European Search Report Application No. EP20210707; dated May 10, 2021; pp. 9.

*Primary Examiner* — An T Nguyen
(74) *Attorney, Agent, or Firm* — Cantor Colburn LLP

(57) ABSTRACT

A grommet is provided for use in a fire and overheat detection system (FODS) clamp. The grommet includes an elongated body defining a central aperture and a slit. The elongated body includes wire mesh.

17 Claims, 3 Drawing Sheets

(56) References Cited

U.S. PATENT DOCUMENTS

| | | | |
|---|---|---|---|
| 2007/0164160 A1* | 7/2007 | Guillois | F16L 3/13 |
| | | | 244/129.2 |
| 2009/0151137 A1* | 6/2009 | Darling, III | B62D 63/061 |
| | | | 24/568 |
| 2015/0214702 A1* | 7/2015 | Langlade | H02G 3/32 |
| | | | 138/104 |
| 2016/0189828 A1* | 6/2016 | Oga | B60R 16/0215 |
| | | | 174/72 A |
| 2016/0247609 A1* | 8/2016 | Wang | H02G 3/22 |
| 2021/0172804 A1* | 6/2021 | Patil | F16L 3/237 |

* cited by examiner

WIRE MESH GROMMET FOR FIRE AND OVERHEAT DETECTION SYSTEM

CROSS REFERENCE TO RELATED APPLICATION

This application claims the benefit of Indian Patent Application No. 201911050817, filed Dec. 9, 2019, which is incorporated herein by reference in its entirety.

BACKGROUND

The following description relates to grommets and, more specifically, to a wire mesh grommet for use in a clamp of a continuous sensor/detector of a fire and overheat detection system (FODS).

Continuous FODS can be installed on aircraft engines to detect fire and overheat conditions. The detectors or sensors are continuous and are routed along outer surfaces of engines in order to provide coverage of a fire hazard area. In many cases, a continuous FODS includes two detector loops mounted on rail assemblies of a given engine to avoid false alarms and provide redundancy.

Detectors in continuous FODS (or continuous detectors) are typically mounting directly on engine structures or by way of tube/rail type assemblies. A basic structure of a rail assembly includes a rail tube, end brackets, sensing element clamps that are welded to the rail tubes and are made of steel/Inconnel™ or other similar metals, grommets, which are inserted into the sensing element clamps and which are normally made of silicone or glass-filled PTFE/Teflon™ or other similar materials, and engine mounting brackets. Since it can be difficult to route the detectors or sensing elements along engine structures without substantial support due to the high vibration conditions present on an aircraft engine, the clamps and the grommets offer proper support between the end brackets to mount the detectors to the engine or a support rail assembly. The grommets hold the sensing elements in place with the help of clamping pressure and serve to dampen vibration or shock coming from the engine. With each sensing element clamp being made of steel/Inconnel™ and being welded to the rail tube structure, the grommets can be assembled between two half-sections of each of the clamps. The grommets are typically split whereby the sensing element can be pushed into them.

With the grommets being made of plastic or PTFE/Teflon™, grommets degrade above certain temperatures and over time become unable to hold a sensing element in place. Meanwhile, newer engine designs continue to run hotter than previous generations and therefore, in certain cases, the grommets of existing designs may not be suitable for all of the applications they are used for. In addition, minimum sensing element loop configurations tend to require about eight grommets or more. Thus, grommet installations can require substantial assembly time and increased numbers of parts.

BRIEF DESCRIPTION

According to an aspect of the disclosure, a grommet is provided for use in a fire and overheat detection system (FODS) clamp. The grommet includes an elongated body defining a central aperture and a slit. The elongated body includes wire mesh.

In accordance with additional or alternative embodiments, the central aperture is sized to tightly fit a sensor element.

In accordance with additional or alternative embodiments, the slit extends from an exterior surface of the elongated body to the central aperture and the central aperture and the slit extend along an entire length of the elongated body.

In accordance with additional or alternative embodiments, the elongated body defines an entry chamber along the slit.

In accordance with additional or alternative embodiments, the elongated body includes tapered sections at opposite longitudinal ends thereof.

In accordance with additional or alternative embodiments, the wire mesh includes metallic wire mesh.

In accordance with additional or alternative embodiments, the metallic wire mesh is lined.

In accordance with additional or alternative embodiments, each strand of the metallic wire mesh is lined.

According to an aspect of the disclosure, a grommet is provided for use in securing a continuous sensing element in a fire and overheat detection system (FODS) clamp. The grommet includes an elongated body formed to define a central aperture sized to tightly fit the sensing element and a slit. The central aperture and the slit each extend along an entire longitudinal length of the elongated body and the slit extends from an exterior surface of the elongated body to the central aperture. The elongated body includes wire mesh.

In accordance with additional or alternative embodiments, the elongated body defines an entry chamber along the slit.

In accordance with additional or alternative embodiments, the elongated body includes tapered sections at opposite longitudinal ends thereof to prevent a sliding of the grommet in the FODS clamp.

In accordance with additional or alternative embodiments, the wire mesh includes metallic wire mesh.

In accordance with additional or alternative embodiments, the metallic wire mesh is lined.

In accordance with additional or alternative embodiments, each strand of the metallic wire mesh is lined.

According to an aspect of the disclosure, a clamp for securing a continuous sensing element in a fire and overheat detection system (FODS) assembly is provided. The clamp includes a clamp body including holders, grommets and clamp parts to wrap over and secure the grommets in the holders. Each grommet includes an elongated body formed to define a central aperture sized to tightly fit the sensing element and a slit. The central aperture and the slit each extend along an entire longitudinal length of the elongated body and the slit extends from an exterior surface of the elongated body to the central aperture. The elongated body includes wire mesh.

In accordance with additional or alternative embodiments, the elongated body defines an entry chamber along the slit.

In accordance with additional or alternative embodiments, the elongated body includes tapered sections at opposite longitudinal ends thereof to prevent a sliding of the grommet in the FODS clamp.

In accordance with additional or alternative embodiments, the wire mesh includes metallic wire mesh.

In accordance with additional or alternative embodiments, the metallic wire mesh is lined.

In accordance with additional or alternative embodiments, each strand of the metallic wire mesh is lined. These and other advantages and features will become more apparent from the following description taken in conjunction with the drawings.

BRIEF DESCRIPTION OF THE DRAWINGS

The subject matter, which is regarded as the disclosure, is particularly pointed out and distinctly claimed in the claims at the conclusion of the specification. The foregoing and other features and advantages of the disclosure are apparent from the following detailed description taken in conjunction with the accompanying drawings in which:

These and other advantages and features will become more apparent from the following description taken in conjunction with the drawings.

DETAILED DESCRIPTION

As will be described below, a FODS assembly is provided and includes grommets to support sensing elements that can withstand temperature and damping requirements. The grommets are easily replaceable with reduced installation time and do not abrade sensing elements. The grommets can be made of Inconel™/stainless steel wire mesh or a wire mesh of similar metallic materials. In any case, metallic wire mesh in this context can be at least a performance enhancing solution. The wire strand and diameter size can be changed to meet a wide range of design specifications, the material has a high strength to weight ratio, the wire mesh material lattice structure can be adjusted to dampen vibration and shock and still withstand required temperatures.

Figure 1:
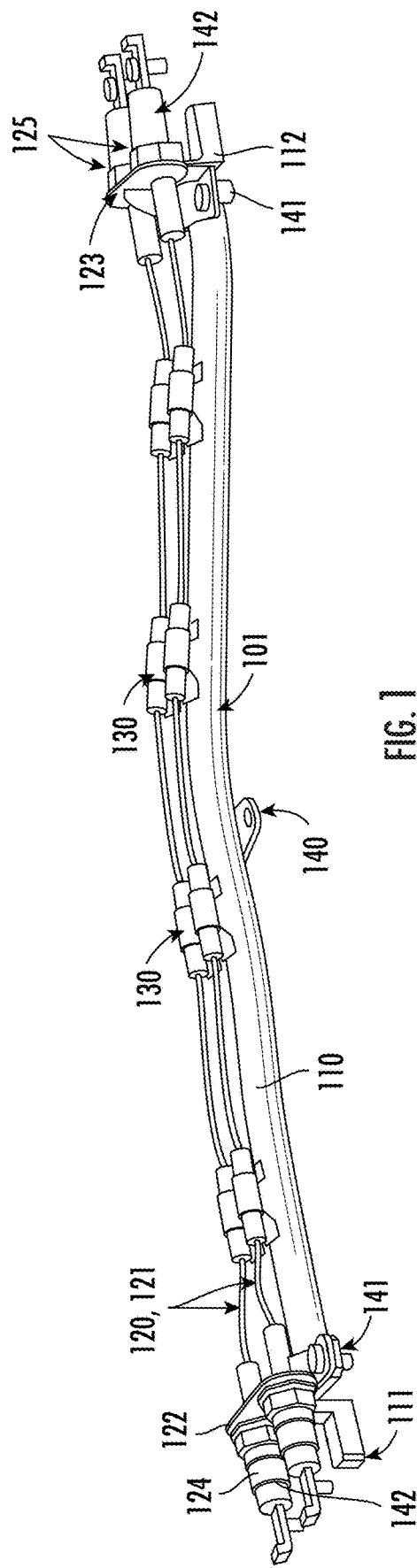
FIG. 1 is a perspective view of a fire and overheat detection system (FODS) assembly in accordance with embodiments.

With reference to FIG. 1, a FODS assembly 101 is provided and includes a rail tube 110 that extends between end lugs 111 and 112, first and second sensing elements 120 and 121 that extend between end brackets 122 and 123 and terminal lugs 124 and 125 and clamps 130. The FODS assembly 101 further includes saddle brackets 141 disposed at the end brackets 122 and 123 and lock nuts 142, which are components of the terminal lugs 124 and 125. The clamps 130 are arranged at intervals along the rail tube 110 to support the first and second sensing elements 120 and 121 at opposite sides of the rail tube 110. The first and second sensing elements 120 and 121 can be provided as relatively thin and elongated sensors and are designed and configured to sense various fire and overheat conditions of an aircraft, for example. To operate properly, the first and second sensing elements 120 and 121 should remain secure in their respective positions relative to the rail tube 110 despite the occurrence of vibrational loading and the application of bending and twisting loads in potentially very high temperature environments. The clamps 130 are disposed and configured to accomplish the securing of the first and second sensing elements 120 and 121.

Figure 2:
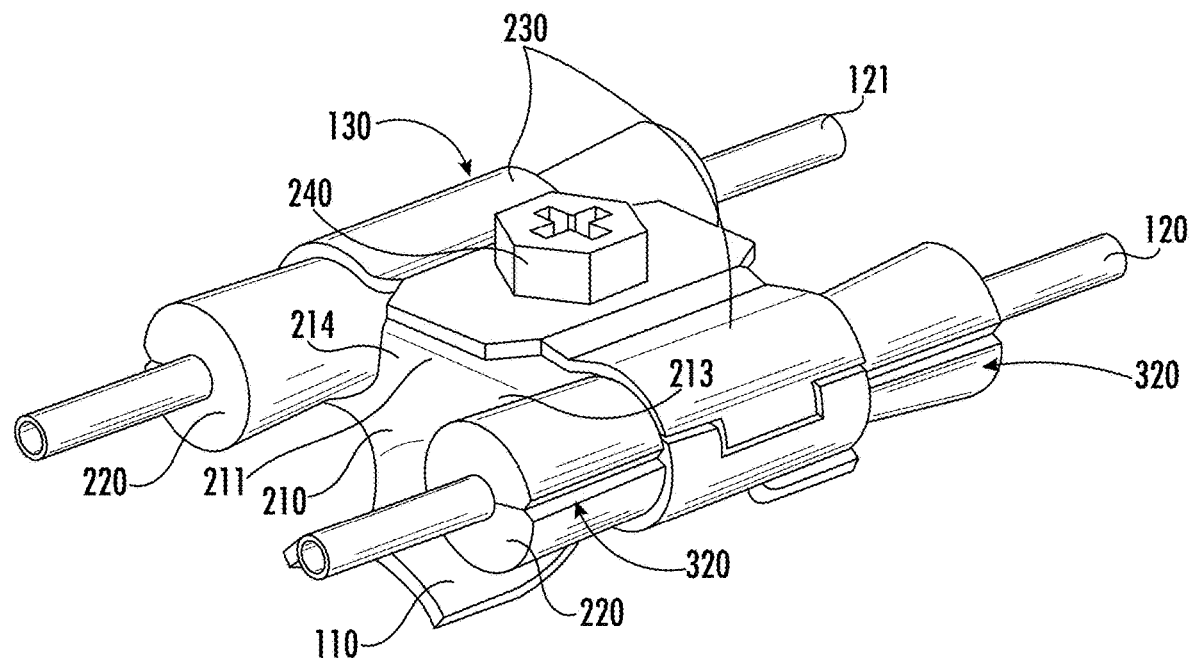
FIG. 2 is a perspective view of a clamp of the FODS assembly of FIG. 1 in accordance with embodiments.

In accordance with embodiments and with reference to FIG. 2, each clamp 130 includes a clamp body 210, grommets 220, clamp parts 230 and a locking element 240. The clamp body 210 can be welded to or additively manufactured onto a rail tube (i.e., the rail tube 110 of FIG. 1) and a base and an upper portion 211. The upper portion 211 can be formed to define first and second grommet holders (hereinafter referred to as "holders") 213 and 214 at opposite sides of the upper portion 211 in cooperation with the clamp parts 230. The grommets 220 are secured in the first and second holders 213 and 214 with the clamp parts 230 being wrapped over and around the grommets 220 and the locking element 240 locking the clamp parts 230 together and to the upper portion 211. Each grommet 220 can have a sensing element (i.e., the second elements 120 and 121 of FIG. 1) extending through it such that, with the grommets 220 secured in the first and second holders 213 and 214, the sensing elements can be effectively secured by the corresponding clamp 130.

Figure 3:
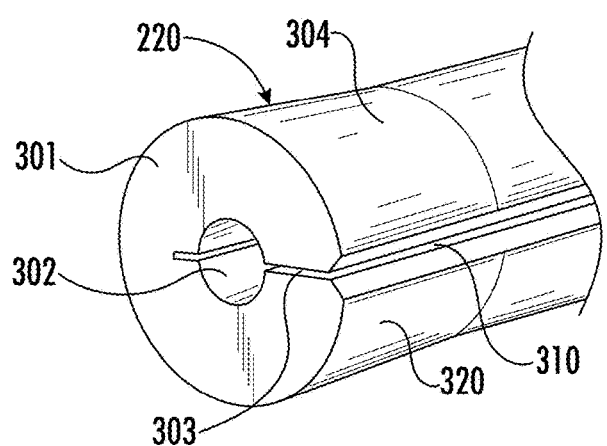
FIG. 3 is an enlarged perspective view of a grommet of the clamp of FIG. 2 in accordance with embodiments.

With continued reference to FIG. 2 and with additional reference to FIG. 3, each grommet 220 has an elongated body 301 that is formed to define a central aperture 302 and a slit 303. The central aperture 302 and the slit 303 extend along an entire longitudinal length of the elongated body 301. The slit 303 extends radially from an exterior surface 304 of the elongated body 301 to the central aperture 302 and thus allows a sensing element (i.e., the sensing elements 120 and 121 of FIG. 1) to be pushed into and through the slit 303 to be received in the central aperture 302. As shown in FIG. 3, each grommet 220 can also include an entry chamber 310 and tapered sections 320 (see FIG. 2). The entry chamber 310 is provided as an entry point of the slit 303 and is configured as a widened portion of the slit 303 to facilitate engagement and reception of the sensing element. The tapered sections 320 can be provided at opposite longitudinal ends of the elongated body 301 and increase respective diameters of the grommets 220 to at least exceed the respective diameters of the first and second holders 213 and 214 and to thus prevent a sliding of the elongated body 301 within the first and second holders 213 and 214.

In accordance with embodiments, where each sensing element is about 0.085", 0.06", 0.065", 0.068" or 0.089", a diameter of the central aperture 302 of each grommet 220 can be provided such that the sensing element fits tightly within the central aperture 302 and such that the grommet 220 fits tightly within the first and second holders 213 and 214. It is to be understood, however, that the sensing element can have any diameter besides those listed above and that the diameter of the central aperture 302 of each grommet 220 can always be provided such that the sensing element fits tightly within the central aperture 302 and such that the grommet 220 fits tightly within the first and second holders 213 and 214.

Figure 4:
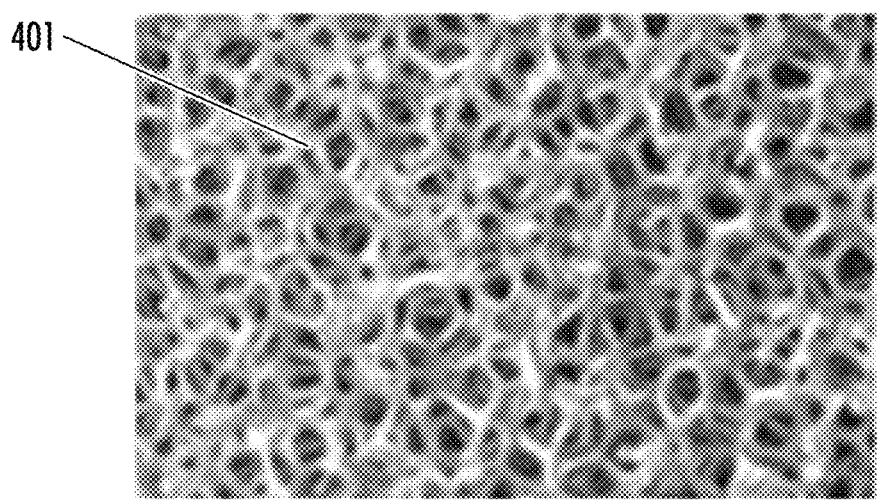
FIG. 4 is an illustration of a wire mesh of the grommet of the clamp of FIGS. 2 and 3.

With reference to FIG. 4, each grommet 220 can be formed of a wire mesh 401. The wire mesh 401 can be provided as a metallic wire mesh with a varied density that is capable or otherwise designed to exhibit a desired compressibility (e.g., a 10-15% compressibility although it is to be understood that the compressibility can be set at any value or range), to exhibit a desired damping rate, to exhibit a desired load handling capability and to exhibit a desired frequency handling capability (e.g., to meet or exceed engine frequency requirements of about 10 Hz to 400 Hz or about 10 Hz to 20,000 Hz). Materials of the wire mesh 401 can be varied but should be capable of withstanding continuous exposure to 450° C. or more or up to 900° C./1100° C. for short periods of time. Exemplary materials of the wire mesh 401 can include, but are not limited to, SS304A alloy with a wire diameter of about 0.0045" and a weight/density of about 0.081 oz./20% or 0.058 oz./20%.

Figure 5:
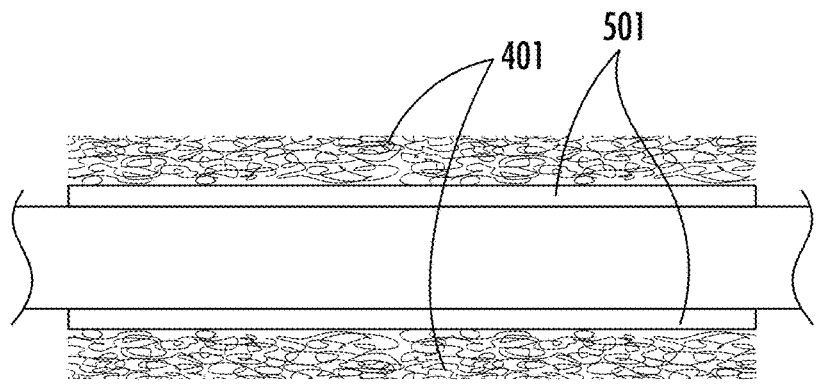
FIG. 5 is a side view of a lining of a grommet in accordance with embodiments.
Figure 6:
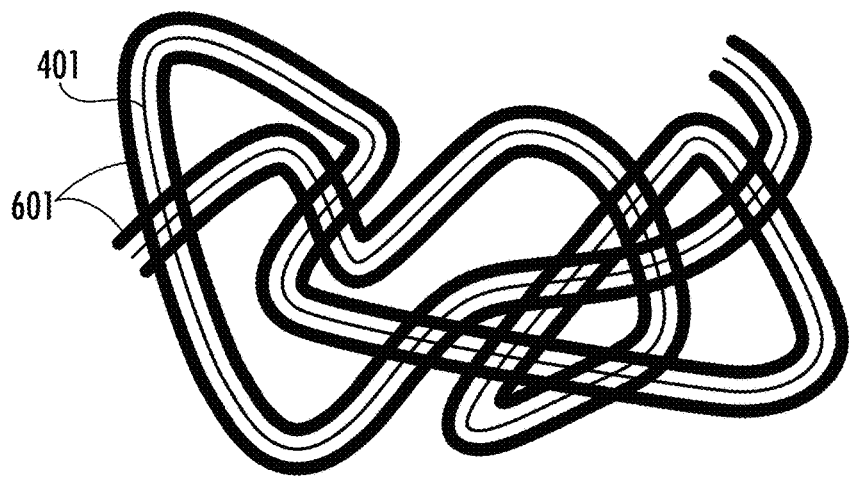
FIG. 6 is a side view of a lining of a strand of a wire mesh in accordance with embodiments.

With reference to FIGS. 5 and 6, the wire mesh 401 can be lined. As shown in FIG. 5, a lining 501 (not to scale) can be provided between the wire mesh 401 and the sensing element (and/or between the wire mesh 401 and the clamp 130). As shown in FIG. 6, the individual strand(s) of the wire mesh 401 can be provided with a lining 601. In either case, the lining 501 or 601 can be provided to reduce or eliminate abrasions of the sensing element by the wire mesh 401 and can be formed of dielectric materials that provide needed thermal conductivity and have the ability to withstand exposure to high-temperatures.

It is to be understood that the lining 501 of FIG. 5 and the lining 601 of the individual strands of FIG. 6 can be used separately or in combination with one another as well as in combination with additional liners.

Technical effects and benefits of the wire mesh grommets as described above are the ability of the resulting grommets to withstand exposures to high temperatures, the ability of the resulting grommets to provide damping and anti-abrasion characteristics. The grommets exhibit easy insertion and removable designs for facilitating local mountings of a sensing element, reduced weight achieved by varying densities, two layers of protection (one for metal clamp and the other from wire mesh) to a sensing element, continuous heat removal due to the good conductivity of the material of the wire mesh and its large surface area and chemical inertness.

While the disclosure is provided in detail in connection with only a limited number of embodiments, it should be readily understood that the disclosure is not limited to such disclosed embodiments. Rather, the disclosure can be modified to incorporate any number of variations, alterations, substitutions or equivalent arrangements not heretofore described, but which are commensurate with the spirit and scope of the disclosure. Additionally, while various embodiments of the disclosure have been described, it is to be understood that the exemplary embodiment(s) may include only some of the described exemplary aspects. Accordingly, the disclosure is not to be seen as limited by the foregoing description, but is only limited by the scope of the appended claims.

What is claimed is:

1. A grommet for use in a fire and overheat detection system (FODS) clamp, the grommet comprising:
   an elongated body defining a central aperture and a slit that extends along an entire length of the elongated body, and
   the elongated body comprising wire mesh,
   wherein the elongated body defines an entry chamber along an entire length of the slit which is configured as a widened portion of the slit to facilitate engagement and reception of a sensing element.

2. The grommet according to claim 1, wherein the central aperture is sized to tightly fit the sensor element.

3. The grommet according to claim 1, wherein:
   the slit extends from an exterior surface of the elongated body to the central aperture, and
   the central aperture extends along the entire length of the elongated body.

4. The grommet according to claim 1, wherein the grommet is held within a holder and the elongated body comprises tapered sections at opposite longitudinal ends thereof,
   wherein the tapered sections increase a diameter of the grommet to exceed a diameter of the holder to prevent a sliding of the elongated body within the holder.

5. The grommet according to claim 1, wherein the wire mesh comprises metallic wire mesh.

6. The grommet according to claim 5, wherein the metallic wire mesh is lined.

7. The grommet according to claim 5, wherein each individual strand of the metallic wire mesh is individually lined with dielectric material.

8. A grommet for use in securing a continuous sensing element in a fire and overheat detection system (FODS) clamp, the grommet comprising:
   an elongated body formed to define a central aperture sized to tightly fit the sensing element and a slit,
   the central aperture and the slit each extending along an entire longitudinal length of the elongated body and the slit extending from an exterior surface of the elongated body to the central aperture, and
   the elongated body comprising wire mesh,
   wherein the elongated body defines an entry chamber along an entire length of the slit which is configured as a widened portion of the slit to facilitate engagement and reception of a sensing element.

9. The grommet according to claim 8, wherein the grommet is held within a holder and the elongated body comprises tapered sections at opposite longitudinal ends thereof to prevent a sliding of the grommet in the FODS clamp,
   wherein the tapered sections increase a diameter of the grommet to exceed a diameter of the holder to prevent the sliding of the elongated body within the holder.

10. The grommet according to claim 8, wherein the wire mesh comprises metallic wire mesh.

11. The grommet according to claim 10, wherein the metallic wire mesh is lined.

12. The grommet according to claim 10, wherein each individual strand of the metallic wire mesh is individually lined with dielectric material.

13. A clamp for securing a continuous sensing element in a fire and overheat detection system (FODS) assembly, the clamp comprising:
   a clamp body comprising holders;
   grommets; and
   clamp parts to wrap over and secure the grommets in the holders,
   each grommet comprising:
      an elongated body formed to define a central aperture sized to tightly fit the sensing element and a slit,
      the central aperture and the slit each extending along an entire longitudinal length of the elongated body and the slit extending from an exterior surface of the elongated body to the central aperture, and
      the elongated body comprising wire mesh,
      wherein the elongated body defines an entry chamber along an entire length of the slit which is configured as a widened portion of the slit to facilitate engagement and reception of a sensing element.

14. The clamp according to claim 13, wherein the grommets are each held within a holder and the elongated body comprises tapered sections at opposite longitudinal ends thereof to prevent a sliding of the grommet in the FODS clamp,
   wherein the tapered sections increase a diameter of each of the grommets to exceed a diameter of the corresponding holder to prevent the sliding of the corresponding elongated body within the corresponding holder.

15. The clamp according to claim 13, wherein the wire mesh comprises metallic wire mesh.

16. The clamp according to claim 15, wherein the metallic wire mesh is lined.

17. The clamp according to claim 15, wherein each individual strand of the metallic wire mesh is individually lined with dielectric material.

* * * * *